(12) United States Patent
Luo

(10) Patent No.: US 12,043,299 B1
(45) Date of Patent: Jul. 23, 2024

(54) FOLDAWAY ELECTRIC WAGON CAPABLE OF CARRYING PEOPLE FOR OUTDOOR USAGE

(71) Applicant: Shenzhen Chepinyi Technology Co., Ltd., Guangdong (CN)

(72) Inventor: Haicheng Luo, Guangdong (CN)

(73) Assignee: Shenzhen Chepinyi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/414,398

(22) Filed: Jan. 16, 2024

(51) Int. Cl.
*B62B 3/02* (2006.01)
*B62B 5/00* (2006.01)

(52) U.S. Cl.
CPC .............. *B62B 3/02* (2013.01); *B62B 5/0069* (2013.01); *B62B 2202/42* (2013.01); *B62B 2205/06* (2013.01)

(58) Field of Classification Search
CPC .... B62B 3/02; B62B 2202/42; B62B 2205/06
See application file for complete search history.

(56) References Cited

U.S. PATENT DOCUMENTS

| | | | | |
|---|---|---|---|---|
| 4,807,716 A * | 2/1989 | Hawkins | ............... | B62B 5/0026 280/655 |
| 5,653,458 A * | 8/1997 | Chaparian | ................. | B62B 3/02 280/30 |
| 7,210,545 B1 * | 5/2007 | Waid | .......................... | B62B 3/12 180/19.1 |
| 7,762,363 B1 * | 7/2010 | Hirschfeld | ............... | B60K 1/04 280/651 |
| 8,069,939 B1 * | 12/2011 | Metzler | ................... | B62B 3/007 280/47.35 |
| 8,453,771 B1 * | 6/2013 | Hirschfeld | .............. | B60L 8/003 180/19.1 |
| 9,908,570 B1 * | 3/2018 | Mayers | ................... | B62D 51/04 |
| 2008/0041644 A1 * | 2/2008 | Tudek | ....................... | B60L 7/12 180/65.1 |
| 2010/0123294 A1 * | 5/2010 | Ellington | ................... | B62B 3/02 180/19.3 |
| 2012/0168237 A1 * | 7/2012 | Oliphant | .................. | B60L 8/003 320/101 |

FOREIGN PATENT DOCUMENTS

| | | |
|---|---|---|
| CN | 210478755 U | 5/2020 |
| CN | 217347854 U | 9/2022 |

* cited by examiner

*Primary Examiner* — Jason D Shanske
*Assistant Examiner* — James J Triggs

(57) ABSTRACT

Disclosed is a foldaway electric wagon capable of carrying people for outdoor usage, including a first wagon frame and a second wagon frame, where the first wagon frame is rotationally connected to the second wagon frame and connected with a first foldaway frame, the second wagon frame is connected with a second foldaway frame, driving wheels are connected to the bottom at the end of the second wagon frame away from the first wagon frame, a control assembly is arranged at one end of the first wagon frame, a pedal assembly is slidably connected to the end of the first wagon frame away from the second wagon frame, universal wheels are connected to the bottom at the end of the pedal assembly facing away from the second wagon frame, and a direction rod is arranged in the middle portion at the end of the first wagon frame.

10 Claims, 9 Drawing Sheets

FOLDAWAY ELECTRIC WAGON CAPABLE OF CARRYING PEOPLE FOR OUTDOOR USAGE

STATEMENT REGARDING PRIOR DISCLOSURES BY AN INVENTOR OR JOINT INVENTOR

The contents of Chinese Patent Application No. 202223096293.7 filed on Nov. 19, 2022 and published on Jul. 4, 2023, is a grace period disclosure and shall not be prior art to claimed invention.

TECHNICAL FIELD

The present disclosure relates to the technical field of outdoor electric trailers, and particularly to a foldaway electric wagon capable of carrying people for outdoor usage.

BACKGROUND

Wagons for outdoor activities, also known as camp wagons, camping wagons or camping carts, are usually used for outdoor activities to transport outdoor equipment (such as energy storage power supplies, outdoor refrigerators, tents, catering equipment, food and communication devices) from indoors or vehicles to outdoor destinations. Bodies of these wagons adopt foldaway structures capable of being easily folded, stored and transported, without occupying too much storage space, therefore, they are very popular among camping enthusiasts. Existing camp wagons usually only have basic functions such as folding and storing items. For example, the Chinese patents numbered CN201921454355.2 (a camp wagon) and CN202220676116.7 (a foldaway structure of a camp wagon) both provide a camp wagon capable of being folded and being used for storing items. However, since camp wagons are always used outdoors, there may be a long walking distance. In addition, such camp wagons can be moved only through manual towing, which undoubtedly increases fatigue of a user during usage and affects the overall user experience.

Therefore, there is an urgent need to design a foldaway electric wagon capable of carrying people for outdoor usage, so as to overcome one or more of the above deficiencies in the prior art.

SUMMARY

In order to achieve the above technical objective, the present disclosure adopting the following technical solution: a foldaway electric wagon capable of carrying people for outdoor usage, including a first wagon frame and a second wagon frame, where the first wagon frame is rotationally connected to the second wagon frame, the first wagon frame is connected with a first foldaway frame, the second wagon frame is connected with a second foldaway frame, adjacent ends of the first foldaway frame and the second foldaway frame are rotationally connected, the first foldaway frame and the second foldaway frame are foldaway relative to each other, driving wheels are connected to the bottom at the end of the second wagon frame away from the first wagon frame, a control assembly is arranged at the end of the first wagon frame provided with the driving wheels, the driving wheels are electrically connected to the control assembly, a pedal assembly is slidably connected to the end of the first wagon frame away from the second wagon frame, universal wheels are connected to the bottom at the end of the pedal assembly facing away from the second wagon frame, and a direction rod for controlling a rotation direction is arranged in the middle portion at the end of the first wagon frame provided with the pedal assembly.

In a preferred embodiment, a front frame is rotationally connected to the end of the first wagon frame away from the second wagon frame, and the front frame is perpendicular to the first wagon frame; and a rear frame is rotationally connected to the end of the second wagon frame away from the first wagon frame, the rear frame is perpendicular to the second wagon frame, the driving wheels are arranged at the bottom end of the rear frame, a protruding first snap-in block is fixedly arranged at the top end of the front frame, and a protruding second snap-in block is fixedly arranged at the top end of the rear frame.

In a preferred embodiment, the first foldaway frame includes: a first connecting rod and a second connecting rod; the first connecting rod intersects with the second connecting rod, the first connecting rod and the second connecting rod are rotationally connected at an intersection, one end of the first connecting rod is rotationally connected to the end of the first wagon frame away from the second wagon frame, the other end of the first connecting rod is rotationally connected to the second foldaway frame, one end of the second connecting rod is rotationally connected to the second foldaway frame, a first fixing member is connected to the end of the second connecting rod away from the connection to the first wagon frame, and a first snap-in hole is formed on the end of the first fixing member away from the connection to the second connecting rod.

In a preferred embodiment, the second foldaway frame includes: a third connecting rod and a fourth connecting rod; the third connecting rod intersects with the fourth connecting rod, the third connecting rod and the fourth connecting rod are rotationally connected at an intersection, one end of the third connecting rod is rotationally connected to the end of the second wagon frame away from the first wagon frame, the other end of the third connecting rod is rotationally connected to the first foldaway frame, one end of the fourth connecting rod is rotationally connected to the first foldaway frame, a second fixing member is connected to the end of the fourth connecting rod away from the connection to the second wagon frame, and a second snap-in hole is formed on the end of the second fixing member3 away from the connection to the fourth connecting rod.

In a preferred embodiment, the pedal assembly includes pedal brackets, the pedal brackets are arranged at the end of the first wagon frame away from the second wagon frame in a sliding manner, the pedal brackets can extend out from the first wagon frame, pedal brace rods are fixedly connected to both sides of the pedal brackets, telescopic grille pedals3 are arranged above the pedal brace rods, and the telescopic grille pedals can retract or expand with the sliding of the pedal brackets for supporting and carrying people.

In a preferred embodiment, side walls of the pedal brackets are each provided with unfolding limiting holes and folding limiting holes, limiting devices are arranged on two sides of one end of the first wagon frame provided with the pedal assembly, and the limiting devices have extending ends that are adapted to the unfolding limiting holes and the folding limiting holes.

In a preferred embodiment, the control assembly includes a power source and a control panel; and the power source is electrically connected to the control panel, both the power source and the control panel are arranged on the end of the second wagon frame away from the first wagon frame, and the driving wheels are electrically connected to the control panel.

In a preferred embodiment, a mounting rod extending horizontally to both sides is arranged on the top of the direction rod, handles are respectively sleeved on both sides of the mounting rod in a sliding manner, the handles can slide in a direction close to the direction rod or in a direction away from the direction rod, the handle on one side can be rotated on the corresponding mounting rod for controlling the speed, a pedal expansion and retraction switch is arranged in the middle of the direction rod, the pedal expansion and retraction switch is electrically connected to the pedal assembly, and the pedal expansion and retraction switch is configured to control the expansion or retraction of the pedal assembly.

In a preferred embodiment, a pressing button is arranged in the middle of the mounting rod, the pressing button is vertically arranged at the top of the direction rod, a return spring is further arranged inside the direction rod, the return spring is connected to the bottom of the pressing button, the bottom of the pressing button is rotationally connected to two switch connecting rods, the switch connecting rods are movably arranged inside the two mounting rods, and the middle portion of the switch connecting rods is rotationally connected to the mounting rods; and a snap-in hook is formed at the end of the switch connecting rods away from the pressing button, the snap-in hook passes through the mounting rods, an unfolding snap-in slot is formed on the inner wall at the end of each of the handles adjacent to the direction rod, the unfolding snap-in slot is adapted to the snap-in hook, a folding snap-in slot is formed on the inner wall at the end of each of the handles away from the direction rod, and the folding snap-in slot is adapted to the snap-in hook.

In a preferred embodiment, a steering sensor is arranged at the bottom of the direction rod, and the steering sensor is electrically connected to the control assembly and is configured to identify a rotation direction of the direction rod.

The present disclosure has the beneficial effects: by arranging the driving wheels and the control assembly to assist the wagon in movement, making the usage of the wagon more convenient and labor-saving, improving the user experience during usage. In addition, the arrangement of the pedal assembly enables the wagon to carry people, when needed, reducing the user's fatigue caused by the usage during a long period of time, and further improving the experience of using the electric wagon.

Figure 1:
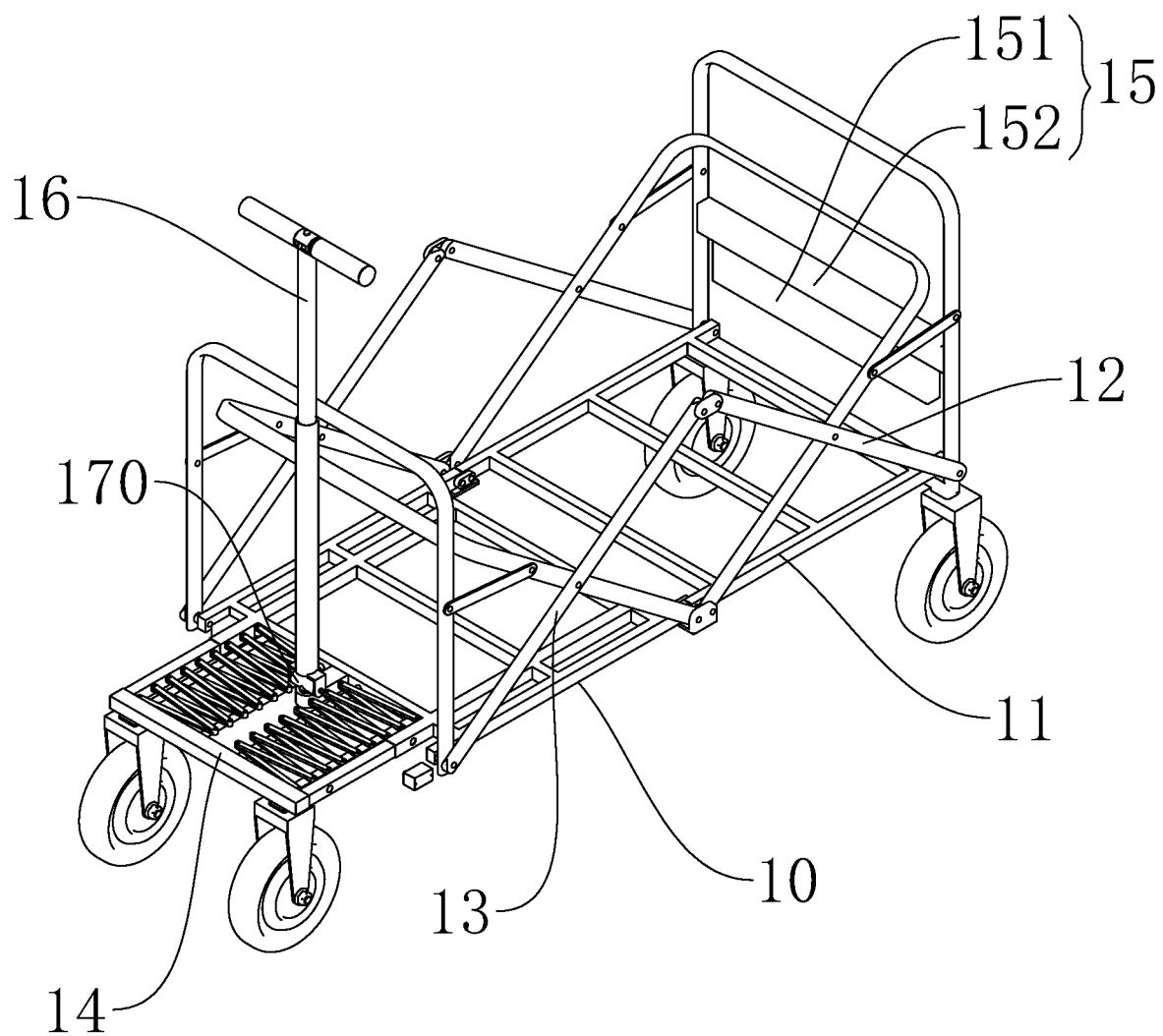
FIG. 1 is a structural schematic diagram of the present disclosure.

REFERENCE NUMERALS IN THE ACCOMPANYING DRAWINGS 10. first wagon frame; 101. front frame; 102. first snap-in block; 11. second wagon frame; 111. rear frame; 112. second snap-in block; 113. driving wheel; 12. first foldaway frame; 121. first connecting rod; 122. second connecting rod; 123. first fixing member; 13. second foldaway frame; 131. third connecting rod; 132. fourth connecting rod; 133. second fixing member; 14. pedal assembly; 141. pedal bracket; 142. pedal brace rod; 143. telescopic grille pedal; 144. unfolding limiting hole; 145. folding limiting hole; 146. limiting device; 147. universal wheel; 15. control assembly; 151. power source; 152. control panel; 16. direction rod; 161. mounting rod; 162. handle; 163. pedal expansion and retraction switch; 164. pressing button; 165. return spring; 166. switch connecting rod; 167. snap-in hook; 168. unfolding snap-in slot; 169. folding snap-in slot; and 170. steering sensor.

DETAILED DESCRIPTIONS OF THE EMBODIMENTS

In order to make the above objectives, features and advantages of the present disclosure more apparent and comprehensible, specific embodiments of the present disclosure will be described in detail below in conjunction with the accompanying drawings. Many specific details are set forth in the following description to facilitate thorough understanding of the present disclosure. However, the present disclosure may be implemented in many other ways different from those described herein, similar improvements may be made by those skilled in the art without departing from the connotation of the present disclosure, and therefore the present disclosure is not limited by the specific embodiments disclosed below.

Figure 2:
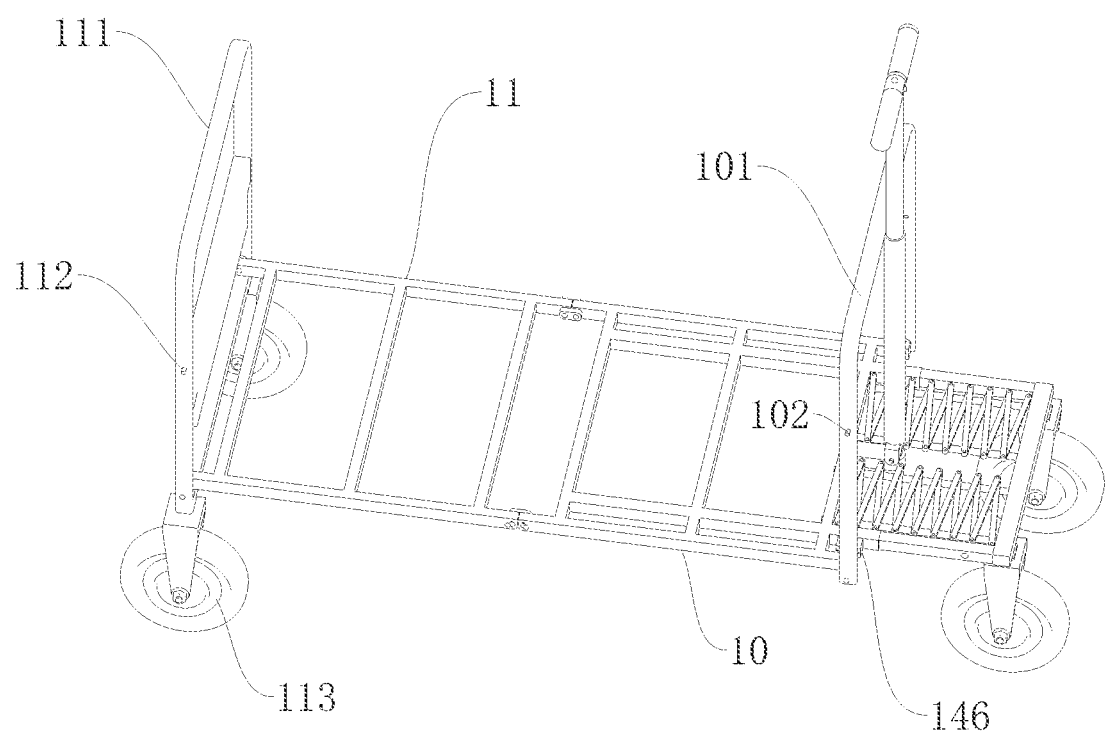
FIG. 2 is a structural schematic diagram of a first wagon frame and a second wagon frame in the present disclosure.
Figure 3:
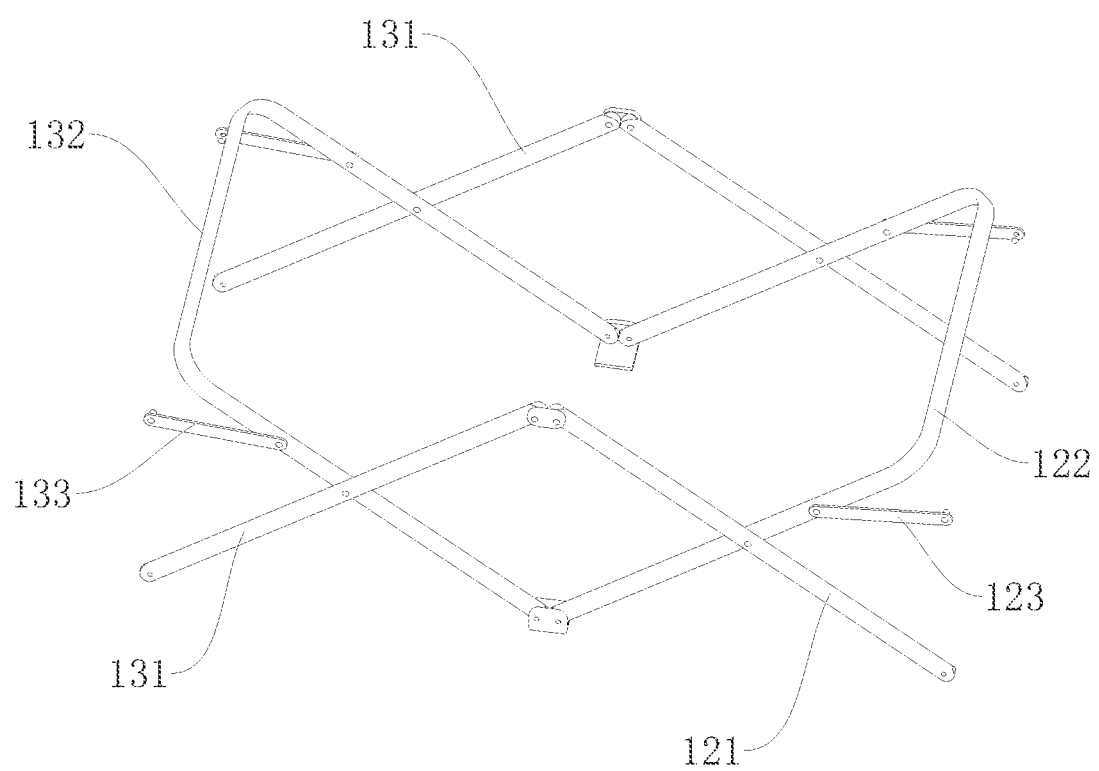
FIG. 3 is a structural schematic diagram of a first foldaway frame and a second foldaway frame in the present disclosure.
Figure 4:
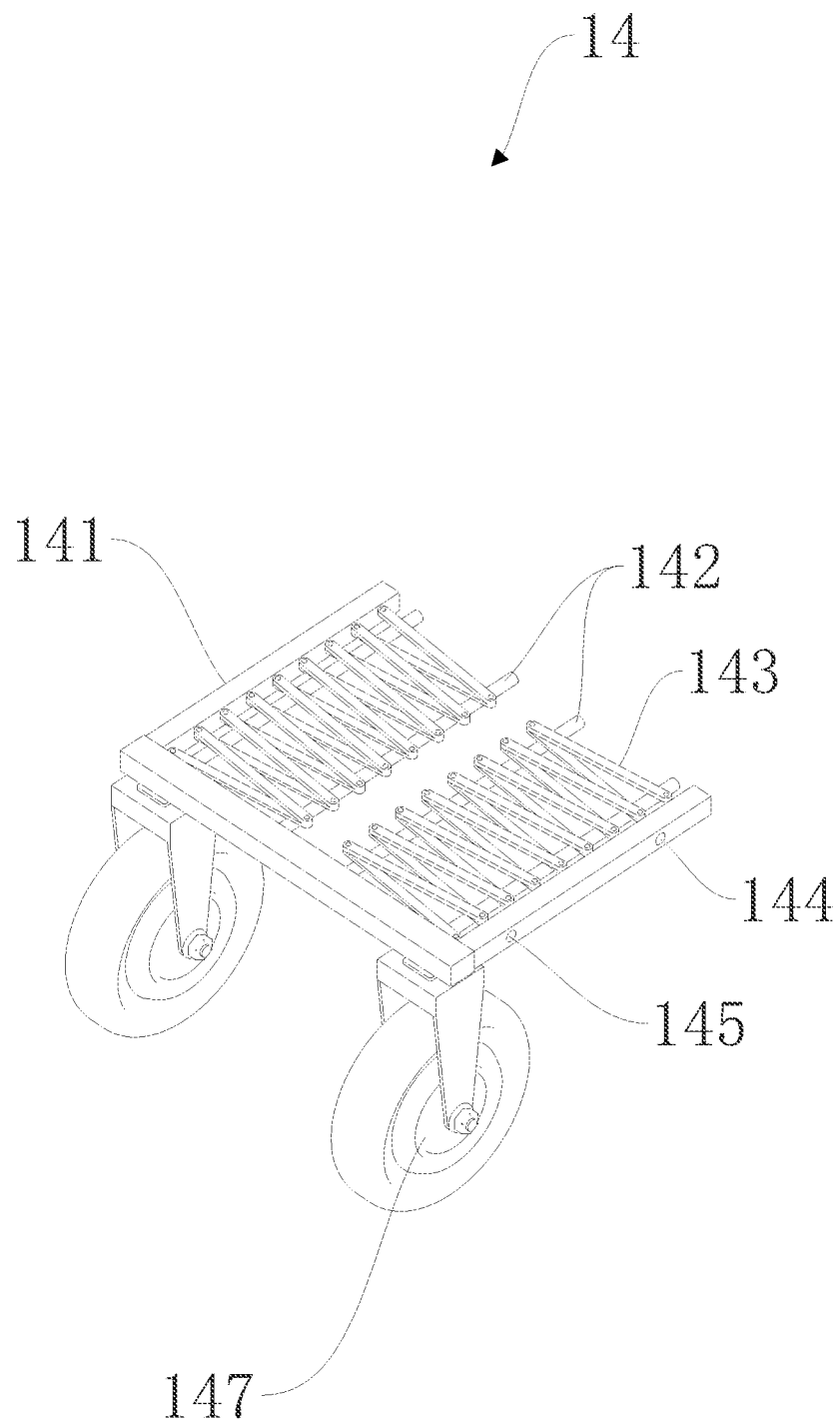
FIG. 4 is a structural schematic diagram of a pedal assembly in the present disclosure.
Figure 5:
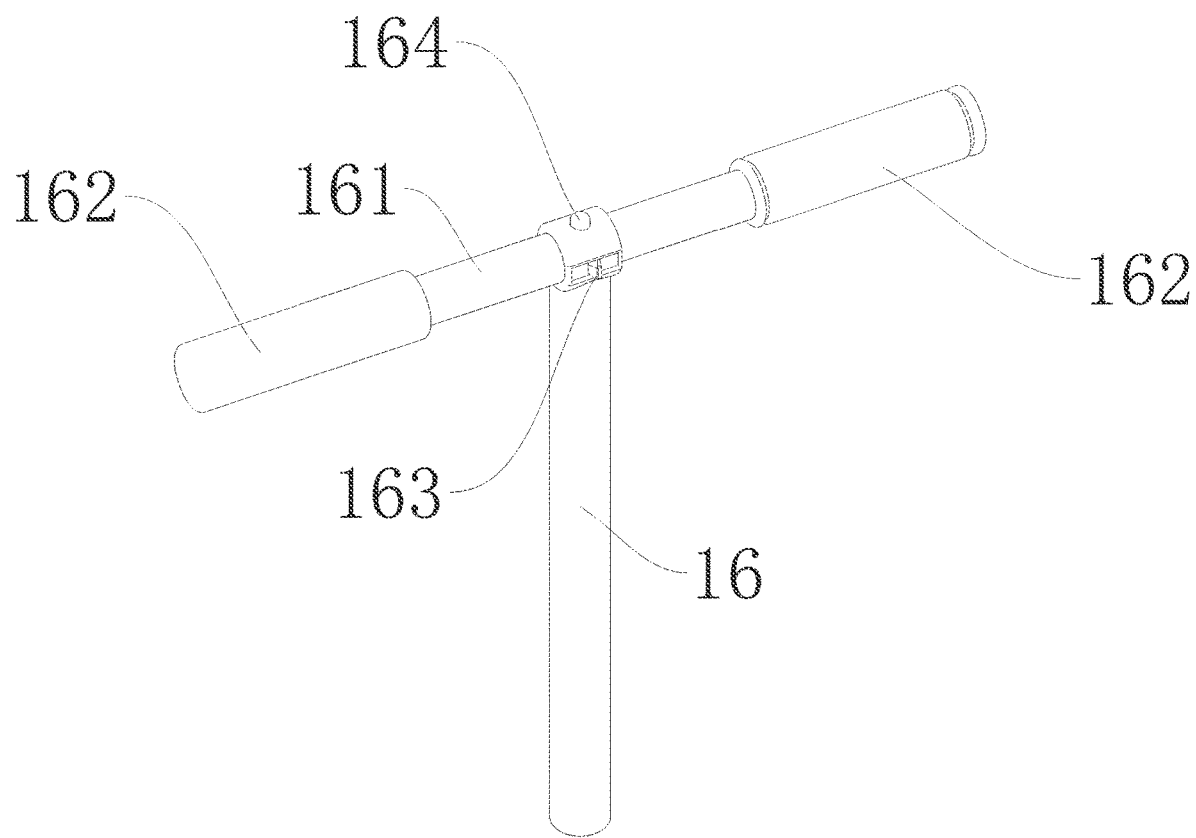
FIG. 5 is a structural schematic diagram of a direction rod in the present disclosure.
Figure 6:
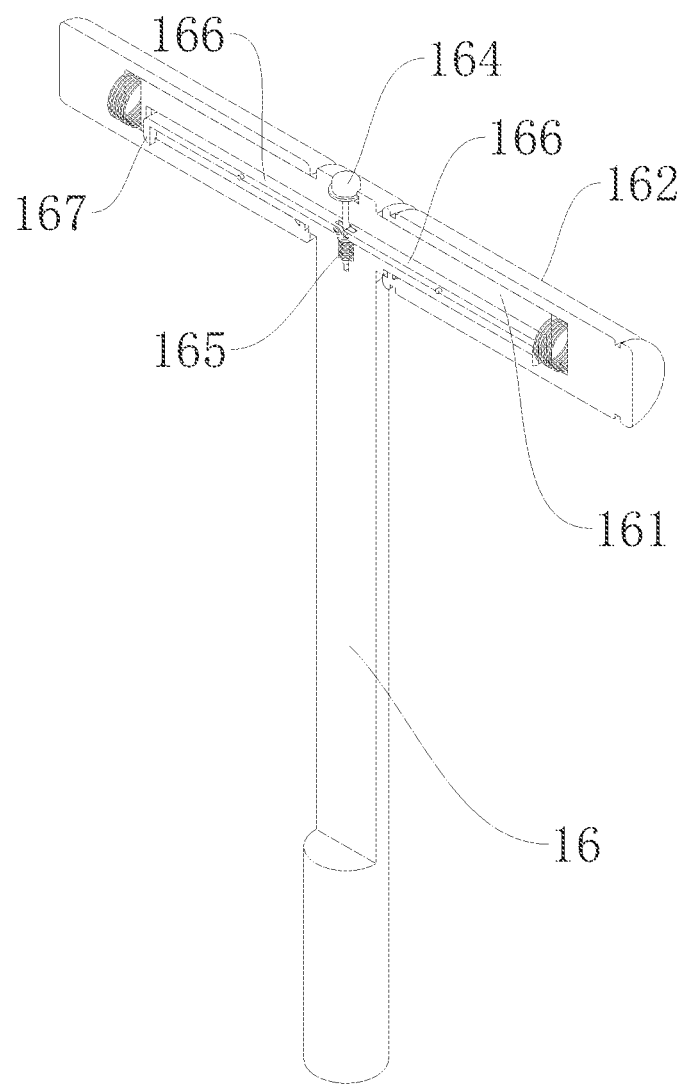
FIG. 6 is a cross-sectional view of a direction rod in a folded state in the present disclosure.
Figure 7:
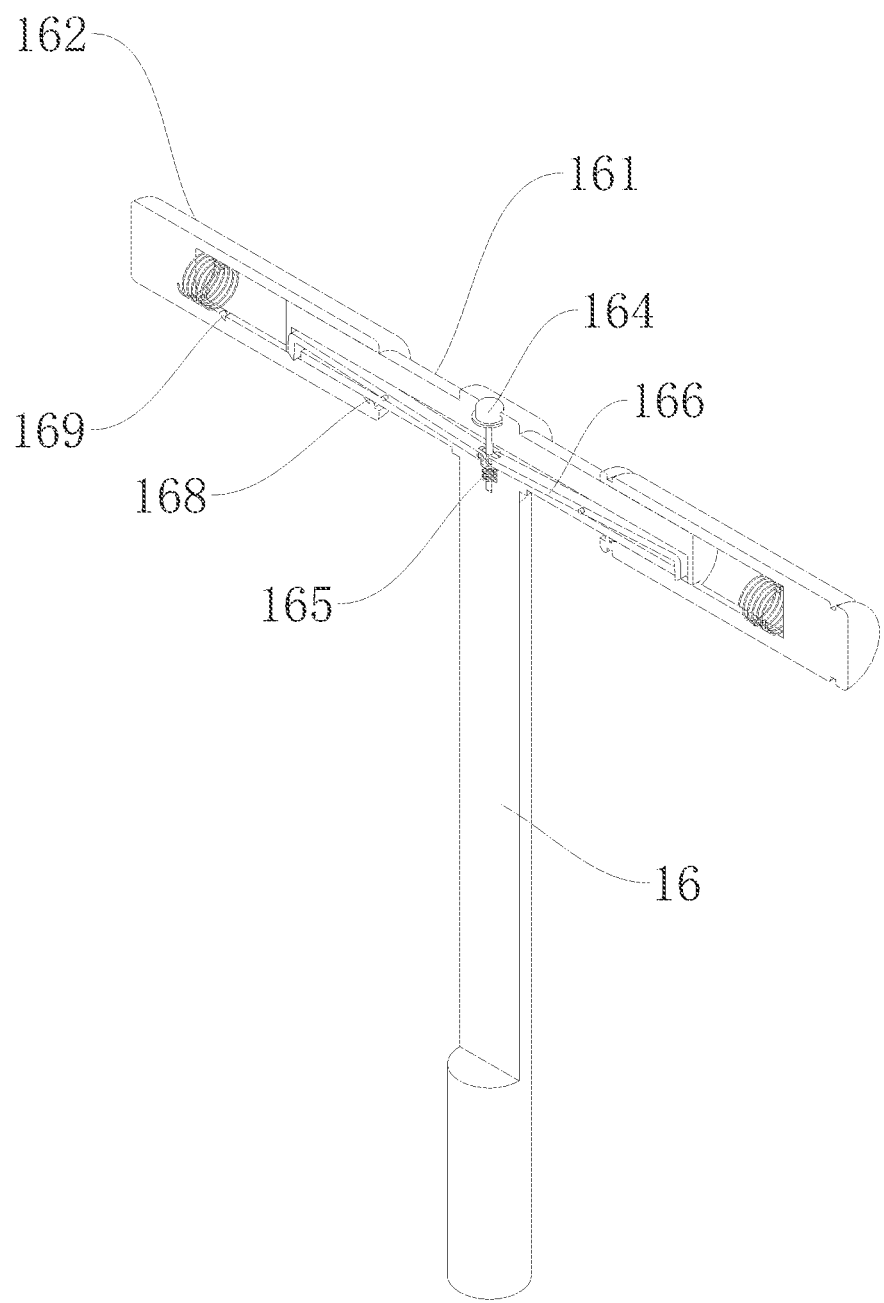
FIG. 7 is a cross-sectional view of a direction rod in an unfolding state in the present disclosure.
Figure 8:
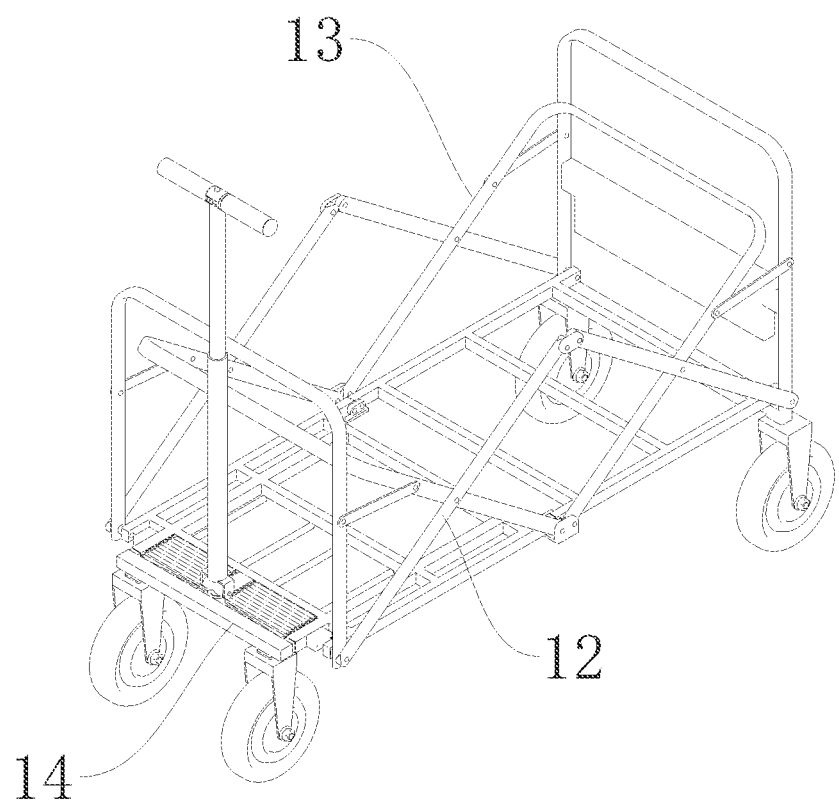
FIG. 8 is a structural schematic diagram of a pedal assembly in the present disclosure.
Figure 9:
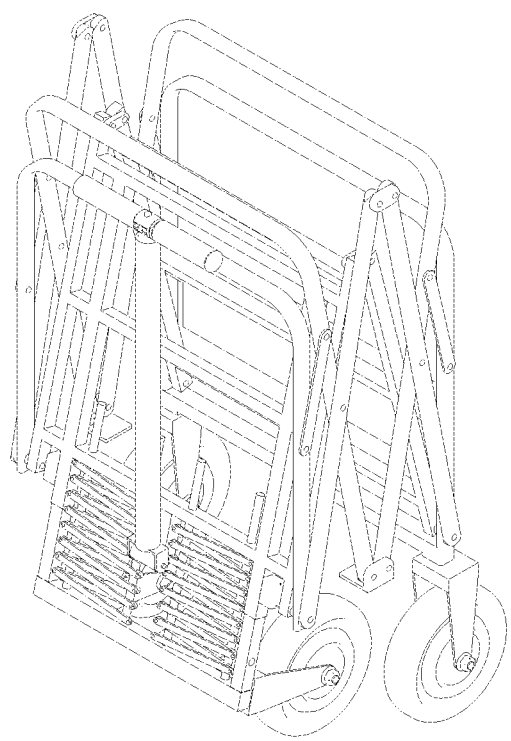
FIG. 9 is a diagram of an overall folded state of the disclosure.

As shown in FIGS. 1-9, the present disclosure provides a foldaway electric wagon capable of carrying people for outdoor usage, including a first wagon frame 10 and a second wagon frame 11, where the first wagon frame 10 is rotationally connected to the second wagon frame 11, the first wagon frame 10 is connected with a first foldaway frame 12, the second wagon frame 11 is connected with a second foldaway frame 13, adjacent ends of the first foldaway frame 12 and the second foldaway frame 13 are rotationally connected, the first foldaway frame 12 and the second foldaway frame 13 are foldaway relative to each other, driving wheels 113 are connected to the bottom at the end of the second wagon frame 11 away from the first wagon frame 10, a control assembly 15 is arranged at the end of the first wagon frame 10 provided with the driving wheels 113, the driving wheels 113 are electrically connected to the control assembly 15, a pedal assembly 14 is slidably connected to the end of the first wagon frame 10 away from the second wagon frame 11, universal wheels 147 are connected to the bottom at the end of the pedal assembly 14 facing away from the second wagon frame 11, and a direction rod 16 for controlling a rotation direction is arranged in the middle portion at the end of the first wagon frame 10 provided with the pedal assembly 14; specifically, one end of the first wagon frame 10 is hinged with one end of the second wagon frame 11, the first wagon frame 10 and the second wagon frame 11 are foldaway relative to each other, where folding directions of the first wagon frame 10 and the second wagon frame 11 are one-way folding directions from bottom to top, the first foldaway frame 12 is arranged on the first wagon frame 10, the second foldaway frame 13 is arranged on the second wagon frame 11, and the adjacent ends of the first foldaway frame 12 and the second foldaway frame 13 are rotationally connected, such that the first foldaway frame 12 and the second foldaway frame 13 are foldaway together with the first wagon frame 10 and the second wagon frame 11 when the first wagon frame 10 and the second wagon frame 11 are folded, allowing for overall folding of the electric wagon and facilitating the usage; two driving wheels 113 arranged at the end of the second wagon frame 11 away from the first wagon frame 10, and the driving wheels 113 are electrically controlled wheels, specific information of which is similar to wheels of an electric scooter; the pedal assembly 14 is slidably arranged inside the end of the first wagon frame 10 away from the second wagon frame 11, the pedal assembly 14 is used for carrying people, the pedal assembly 14 can slide out from the first wagon frame 10 when in use, and can retract into the first wagon frame 10 when not in use; two universal wheels 147 are arranged at the bottom of the front end of the pedal assembly 14, the two universal wheels 147 slide with the sliding of the pedal assembly 14, and when the pedal assembly 14 slides out from the first wagon frame 10, the two universal wheels 147 moves with the movement of the pedal assembly 14, such that the universal wheels 147 form a support with the first wagon frame 10, and the pedal assembly 14 is propped up to facilitate carrying people, preventing a tail of the electric wagon from lifting due to too heavy at one end thereof; the control assembly 15 is further arranged at the end of the second wagon frame 11 away from the first wagon frame 10, the control assembly 15 is configured to control the driving wheels 113 and supply power 151 to the driving wheels 113, the first wagon frame 10 and the second wagon frame 11 can be unfolded when in use, in which case, the first foldaway frame 12 and the second foldaway frame 13 are also folded under the driving of the first wagon frame 10 and the second wagon frame 11, a storage bag is then placed on the first wagon frame 10 and the second wagon frame 11, and the items can be put into the storage bag for preventing items from falling; and when it is necessary to carry people for a long journey, the pedal assembly 14 can be pulled out from the first wagon frame 10 to make it extended, and the pedal assembly 14 is then supported by the universal wheels 147, such that people can stand on the pedal assembly 14; when there is no need to carry people for a short journey, and the pedal assembly 14 can be retracted into the first wagon frame 10 to avoid affecting the usage of the wagon. In order to facilitate towing and steering in a state of carrying people, the direction rod 16 for controlling a rotation direction is further arranged in the middle portion at the end of the first wagon frame 10 provided with the pedal assembly 14, the direction rod 16 can rotate on the first wagon frame 10, the direction rod 16 is electrically connected to the control assembly 15, when the direction rod 16 rotates in a specific direction, the control assembly 15 will receive relevant information and send control information to the driving wheels 113, the driving wheels 113 are controlled to rotate and drive the electric wagon to steer, and the direction rod 16 can not only rotates in place, but can also rotate relative to the first wagon frame 10 to facilitate direction control during towing.

Further, in this embodiment, a front frame 101 is rotationally connected to the end of the first wagon frame 10 away from the second wagon frame 11, and the front frame 101 is perpendicular to the first wagon frame 10; and a rear frame 111 is rotationally connected to the end of the second wagon frame 11 away from the first wagon frame 10, the rear frame 111 is perpendicular to the second wagon frame 11, the driving wheels 113 are arranged at the bottom end of the rear frame 111, a protruding first snap-in block 102 is fixedly arranged at the top end of the front frame 101, and a protruding second snap-in block 112 is fixedly arranged at the top end of the rear frame 111; specifically, both the front frame 101 and the rear frame 111 are C-shaped, both ends thereof are rotationally connected to one ends of the corresponding first wagon frame 10 and the second wagon frame 11 respectively, and when the wagon is in a usage state for connecting to the first foldaway frame 12 and the second foldaway frame 13, the front frame 101 and the rear frame 111 are respectively perpendicular to the first wagon frame 10 and the second wagon frame 11, further, the first snap-in block 102 and the second snap-in block 112 are respectively arranged on a side wall of the top part of the front frame 101 and the rear frame 111, and the first foldaway frame 12 and the second foldaway frame 13 are capable of being connected to the front frame 101 and the rear frame 111 through the first snap-in block 102 and the second snap-in block 112.

Further, in this embodiment, the first foldaway frame 12 includes: a first connecting rod 121 and a second connecting rod 122; the first connecting rod 121 intersects with the second connecting rod 122, the first connecting rod 121 and the second connecting rod 122 are rotationally connected at an intersection, one end of the first connecting rod 121 is rotationally connected to the end of the first wagon frame 10 away from the second wagon frame 11, the other end of the first connecting rod 121 is rotationally connected to the second foldaway frame 13, one end of the second connecting rod 122 is rotationally connected to the second foldaway frame 13, a first fixing member 123 is connected to the end of the second connecting rod 122 away from the connection to the first wagon frame 10, and a first snap-in hole (not shown in the figures) is formed on the end of the first fixing member 123 away from the connection to the second connecting rod 122; specifically, the first connecting rod 121 intersects with the second connecting rod 122, and the first connecting rod 121 and the second connecting rod 122 are rotationally connected at the intersection, such that the first connecting rod 121 and the second connecting rod 122 can rotate relative to each other and can be folded together, one end of the first connecting rod 121 is rotationally connected to the end of the first wagon frame 10 provided with the pedal assembly 14, the other end thereof is rotationally connected to the second foldaway frame 13, and one end of the second connecting rod 122 is rotationally connected to the second foldaway frame 13; since the first connecting rod 121 and the second connecting rod 122 are in a cross shape, and one end of the second connecting rod 122 is close to the front frame 101 when being unfolded, placing items into the first wagon frame 10 will not be affected; in order to improve the overall stability of the first foldaway frame 12, the second connecting rod 122 is C-shaped and connected to both sides of the first wagon frame 10, the first fixing member 123 is arranged on the end of the second connecting rod 122 away from the connection to the pedal assembly 14, a first snap-in hole is formed on one end of the first fixing member 123, the first snap-in hole is adapted to the first snap-in block 102, and the first fixing member 123 can be hooked on the first snap-in block 102; by connecting the first fixing member 123 to the front frame 101, the first foldaway frame 12 can realize a fixed state when being unfolded, so as to prevent the second connecting rod 122 from being folded when it is subjected to heavy pressure; when folding is required and the first foldaway frame 12 is subjected to pressure, the end of the first connecting rod 121 connecting to the second foldaway frame 13 moves upwards, and the end of the second connecting rod 122 connecting to the second foldaway frame 13 moves downwards, such that the first foldaway frame 12 and the second foldaway frame 13 move close to each other to achieve folding.

Further, in this embodiment, the second foldaway frame 13 includes: a third connecting rod 131 and a fourth connecting rod 132; the third connecting rod 131 intersects with the fourth connecting rod 132, the third connecting rod 131 and the fourth connecting rod 132 are rotationally connected at an intersection, one end of the third connecting rod 131 is rotationally connected to the end of the second wagon frame 11 away from the first wagon frame 10, the other end of the third connecting rod 131 is rotationally connected to the first foldaway frame 12, one end of the fourth connecting rod 132 is rotationally connected to the first foldaway frame 12, a second fixing member 133 is connected to the end of the fourth connecting rod 132 away from the connection to the second wagon frame 11, and a second snap-in hole is formed on the end of the second fixing member 133 away from the connection to the fourth connecting rod 132; specifically, a structure of the second foldaway frame 13 is same as that of the first foldaway frame 12, one end of the third connecting rod 131 is rotationally connected to the end of the second wagon frame 11 away from the first wagon frame 10, and the other end thereof is rotationally connected to the end of the first connecting rod 121 away from the connection end with the first wagon frame 10, such that the third connecting rod 131 and the first connecting rod 121 can move closer to each other in opposite directions; since the third connecting rod 131 and the fourth connecting rod 132 are arranged crosswise, one end of the fourth connecting rod 132 is close to the rear frame 111 when being unfolded, placing items into the second wagon frame 11 will not be affected; in order to improve the overall stability of the second foldaway frame 13, the fourth connecting rod 132 is C-shaped and connected to both sides of the second wagon frame 11, one end of the fourth connecting rod 132 is rotationally connected to the end of the second connecting rod 122 provided with the first fixing member 123, such that the fourth connecting rod 132 and the second connecting rod 122 can move closer to each other in opposite directions, the second fixing member 133 is arranged at the end of the fourth connecting rod 132 away from the second connecting rod 122, a second snap-in hole (not shown in the figures) is formed on one end of the second fixing member 133, the second snap-in hole is adapted to the second snap-in block 112, and the second fixing member can be hooked on the second snap-in block 112 to fix the second foldaway frame 13 and prevent the fourth connecting rod 132 from being folded when it is subjected to heavy pressure; when folding is required and the second foldaway frame 13 is subjected to pressure, the end of the third connecting rod 131 connecting to the first connecting rod 121 moves upwards, and the end of the fourth connecting rod 132 connecting to the second connecting rod 122 moves downwards, such that the second foldaway frame 13 and the first foldaway frame 12 move closer to each other to achieve folding.

When the electric wagon needs to be folded, the first wagon frame 10 and the second wagon frame 11 are first lifted up from below, such that the first wagon frame 10 and the second wagon frame 11 are close to each other, further, the end of the first connecting rod 121 connecting to the third connecting rod 131 is driven to move upwards, the other end thereof moves closes to each other, the end of the second connecting rod 122 connecting to the fourth connecting rod 132 moves downwards, the other end thereof moves closes to each other, and finally they achieve a close fit and folding; in order to achieve automatic folding, a lifting member can be arranged at a connection between the fourth connecting rod 132 and the second connecting rod 122, and the lifting member is arranged directly below the connection of the first wagon frame 10 and the second wagon frame 11; when folding is required, the first wagon frame 10 and the second wagon frame 11 can be lifted up to a certain height by controlling the lifting member, a forward rotation of the driving wheels 113 is controlled by braking the universal wheels 147, in which case, the second wagon frame 11 and the first wagon frame 10 are lifted up, and force of supporting and lifting each other is lost, such that the second wagon frame 11 moves closer to the first wagon frame 10 after being driven by the driving wheels 113, and folding is finally achieved; and when unfolding is required, the universal wheels 147 are braked, and a reverse rotation of the driving wheels 113 are controlled to achieve unfolding.

Further, in this embodiment, the pedal assembly 14 includes pedal brackets 141, the pedal brackets 141 are arranged at the end of the first wagon frame 10 away from the second wagon frame 11 in a sliding manner, the pedal brackets 141 can extend out from the first wagon frame 10, pedal brace rods 142 are fixedly connected to both sides of the pedal brackets 141, telescopic grille pedals 143 are arranged above the pedal brace rods 142, and the telescopic grille pedals 143 can retract or expand with the sliding of the pedal brackets 141 for supporting and carrying people; specifically, the pedal brackets 141 are arranged inside the end of the first wagon frame 10 provided with the front frame 101 in a sliding manner, and the pedal brackets 141 are arranged in a telescopic structure, that is, both ends of the pedal brackets can be inserted into both sides of the first wagon frame 10 and can be extended out, when needed; further, the pedal brace rods 142 are fixedly arranged on both sides of the pedal brackets 141 respectively, one end of each of the pedal brace rods 142 is fixedly connected to the pedal brackets 141, and the other end thereof penetrates through a side wall of the front end of the first wagon frame 10 and extends into the first wagon frame 10 with the retraction of the pedal brackets 141; the telescopic grille pedals 143 are arranged above the pedal brace rods 142, the telescopic grille pedals 143 are composed of a plurality of connecting rods, both ends of the telescopic grille pedals 143 are fixedly connected to the front end of the pedal brackets 141 and the front end of the first wagon frame 10, and the telescopic grille pedals 143 are squeezed when the pedal brackets 141 are retracted, such that the telescopic grille pedals 143 are folded together; when the pedal brackets 141 extend out from the first wagon frame 10, the telescopic grille pedals 143 are driven to unfold, such that people can stand on the telescopic grille pedals and the function of carrying people is thus achieved, where the two universal wheels 147 are connected to the bottom surface at the front end of the pedal brackets 141.

Further, side walls of the pedal brackets 141 are each provided with unfolding limiting holes 144 and folding limiting holes 145, limiting devices 146 are arranged on two sides of one end of the first wagon frame 10 provided with the pedal assembly 14, and the limiting devices 146 have extending ends that are adapted to the unfolding limiting holes 144 and the folding limiting holes 145; specifically, in order to prevent the pedal assembly 14 from unfolding when not in use or pedal assembly 14 from retracting when in use, electric limiting devices 146 are mounted on both sides of the first wagon frame 10, each of the electric limiting devices 146 has extending end, the unfolding limiting holes 144 are formed on the front end of the pedal brackets 141 and the folding limiting holes 145 are formed on the rear end of the pedal brackets 141, and the electric limiting devices 146 control the extending end to extend and enable the extending end to insert into the unfolding limiting holes 144 or the folding limiting holes 145 upon receipt of an instruction, such that the pedal assembly 14 is limited to an unfolded state or a folded state, thereby avoiding self-folding or self-unfolded; and the electric limiting devices 146 can be replaced with manual limiting devices 146 according to actual usage requirements.

Further, in this embodiment, the control assembly 15 includes a power source 151 and a control panel 152; the power source 151 is electrically connected to the control panel 152, both the power source 151 and the control panel 152 are arranged on the end of the second wagon frame 11 away from the first wagon frame 10, and the driving wheels 113 are electrically connected to the control panel 152; specifically, the power source 151 and the control panel 152 are both arranged inside the rear frame 111, the power source 151 is electrically connected to the control panel 152, and the two driving wheels 113 are electrically connected to the control panel 152.

Further, in this embodiment, a mounting rod 161 extending horizontally to both sides is arranged on the top of the direction rod 16, handles 162 are respectively sleeved on both sides of the mounting rod 161 in a sliding manner, the handles 162 can slide in a direction close to the direction rod 16 or in a direction away from the direction rod 16, and the handle 162 on one side can be rotated on the corresponding mounting rod 161 for controlling the speed, a pedal expansion and retraction switch 163 is arranged in the middle of the direction rod 16, the pedal expansion and retraction switch 163 is electrically connected to the pedal assembly 14, and the pedal expansion and retraction switch 163 is configured to control the expansion or retraction of the pedal assembly 14; specifically, the mounting rod 161 is integrally formed with the direction rod 16, the mounting rod 161 is located on both sides of the direction rod 16, two handles 162 are separately sleeved on both sides of the mounting rod 161, one of the handles 162 can slide on the mounting rod 161, and the other handle 162 can rotate on the mounting rod 161 and is electrically connected to the control panel 152 for controlling the speed and braking of the electric wagon, where the braking is achieved through the handles 162 that will automatically rotate after losing the force exerted by a user or the handles 162 that will rotate due to the control of the user, and the control of speed will be achieved in the rotation process; in order to facilitate the control of the pedal assembly 14 for retraction or expansion and prevent the handles 162 from movement, the pedal expansion and retraction switch 163 is mounted on the direction rod 16, the pedal expansion and retraction switch 163 is electrically connected to the electric limiting devices 146, and the extending ends of the electric limiting devices 146 are retracted or extended by toggling the pedal expansion and retraction switch 163, such that pedal assembly 14 can smoothly expand or retract for fixation. It should be noted that the expansion or retraction of the pedal assembly 14 can be achieved by braking the universal wheels 147, and a forward or backward rotation of the driving wheels 113 can be accordingly controlled, in which case, the universal wheels 147 are braked and cannot move; when the driving wheels 113 are rotating, the first wagon frame 10 is driven to more forward or backward relative to the pedal assembly 14, automatic expansion or retraction of the pedal assembly 14 is accordingly achieved; after the pedal assembly 14 is expanded or retracted, the pedal assembly 14 can be fixed through the electric limiting devices 146 by toggling the pedal expansion and retraction switch 163.

Further, in this embodiment, a pressing button 164 is arranged in the middle of the mounting rod 161, the pressing button 164 is vertically arranged at the top of the direction rod 16, a return spring 165 is further arranged inside the direction rod 16, the return spring 165 is connected to the bottom of the pressing button 164, the bottom of the pressing button 164 is rotationally connected to two switch connecting rods 166, the switch connecting rods 166 are movably arranged inside the two mounting rods 161, and the middle portion of the switch connecting rods 166 is rotationally connected to the mounting rods 161; a snap-in hook 167 is formed at the end of the switch connecting rods 166 away from the pressing button 164, the snap-in hook 167 passes through the mounting rods 161, an unfolding snap-in slot 168 is formed on the inner wall at the end of each of the handles 162 adjacent to the direction rod 16, the unfolding snap-in slot 168 is adapted to the snap-in hook 167, a folding snap-in slot 169 is formed on the inner wall at the end of each of the handles 162 away from the direction rod 16, and the folding snap-in slot 169 is adapted to the snap-in hook 167; specifically, the pressing button 164 is arranged at the top of the direction rod 16 in a sliding manner and can slide up and down within the direction rod 16, the return spring 165 is arranged below the pressing button 164, and the return spring 165 abuts against the pressing button 164; the return spring 165 is squeezed when the pressing button 164 is pressed down by external force, and the return spring 165 lifts the pressing button 164 up when the pressing button 164 loses external force; the switch connecting rods 166 are rotationally connected to both sides at the bottom of the pressing button 164, the switch connecting rods 166 correspond to both sides of the mounting rods 161 and are movably mounted inside the mounting rods 161 respectively, the middle portion of the switch connecting rods 166 is rotationally connected to the mounting rods 161, such that the switch connecting rods 166 form a lever structure, and one end thereof will tilt upwards when the other end is subjected to force; the snap-in hook 167 facing downwards is formed at the end of the switch connecting rods 166 connecting to the pressing button 164, and the snap-in hook 167 the pressing button 164 passes through a side wall of the mounting rod 161 and abuts against inner walls of the handles 162; when the pressing button 164 is pressed down by external force, the return spring 165 is squeezed, and the end of the switch connecting rods 166 connecting to the pressing button is driven to sink, such that the other end of the switch connecting rods 166 rises, and the snap-in hook 167 is driven to retract into the mounting rod 161, in which case, the handles 162 loses the restriction from the snap-in hook 167 and can slide on the mounting rod 161; when the pressing button 164 loses external force, the pressing button is lifted up through restoring force of the return spring 165, the end of the switch connecting rod 166 connecting to the pressing button 164 is driven to rise and the other end thereof sinks accordingly, such that the snap-in hook 167 passes through the mounting rod 161 and cooperates with the unfolding snap-in slot 168 or the folding snap-in slot 169 on the side walls of the handles 162 to restrict the handles 162.

Further, in this embodiment, a steering sensor 170 is arranged at the bottom of the direction rod 16, and the steering sensor 170 is electrically connected to the control assembly 15 and is configured to identify a rotation direction of the direction rod 16; specifically, in order to accurately identify the rotation direction of the direction rod 16, the steering sensor 170 is arranged at the bottom of the direction rod 16, and the steering sensor 170 is an encoder; the encoder is driven to rotate synchronously when the direction rod 16 is rotating, the control panel 152 will detect the rotation direction and rotation angle of the encoder when the encoder is rotating, and the control panel 152 then adjusts a traveling direction of the electric wagon by controlling a speed difference of the two driving wheels 113, for example, when the direction rod 16 rotates rightwards and drives the encoder to rotate rightwards, the control panel 152 controls the driving wheel 113 on the right not to rotate and the driving wheel 113 on the left to rotate after the control panel 152 detects that the encoder rotates rightwards, in which case, a wagon body of the electric wagon will swing rightwards, such that the steering of the electric wagon is achieved through the speed difference of the two driving wheels 113.

To sum up, the present disclosure achieves electric power drive by arranging the driving wheels 113 and the control assembly 15 to assist the wagon in movement, making the usage of the wagon more convenient and labor-saving, improving the user experience during usage. In addition, the arrangement of the pedal assembly 14 enables the wagon to carry people, when needed, reducing the user's fatigue caused by the usage during a long period of time, and further improving the experience of using the electric wagon.

The present disclosure is not only limited to the descriptions in the specification and implementations, such that those skilled in the art may easily achieve additional advantages and modifications. Therefore, the present disclosure is not limited to specific details, representative apparatus and illustrative examples shown and described herein without departing from the spirit and scope of the general concept as defined by the append claims and equivalents thereof.

What it claimed is:

1. A foldaway electric wagon capable of carrying people for outdoor usage, comprising a first wagon frame and a second wagon frame, wherein the first wagon frame is rotationally connected to the second wagon frame, the first wagon frame is connected with a first foldaway frame, the second wagon frame is connected with a second foldaway frame, adjacent ends of the first foldaway frame and the second foldaway frame are rotationally connected, the first foldaway frame and the second foldaway frame are foldaway relative to each other, driving wheels are connected to a bottom at the end of the second wagon frame away from the first wagon frame, a control assembly is arranged at the first wagon frame at an end provided with the driving wheels, the driving wheels are electrically connected to the control assembly, a pedal assembly is slidably connected to the end of the first wagon frame away from the second wagon frame, universal wheels are connected to a bottom at the end of the pedal assembly facing away from the second wagon frame, and a direction rod for controlling a rotation direction is arranged in a middle portion at the end of the first wagon frame provided with the pedal assembly.

2. The foldaway electric wagon capable of carrying people for outdoor usage according to claim 1, wherein a front frame is rotationally connected to the end of the first wagon frame away from the second wagon frame, and the front frame is perpendicular to the first wagon frame; and a rear frame is rotationally connected to the end of the second wagon frame away from the first wagon frame, the rear frame is perpendicular to the second wagon frame, the driving wheels are arranged at a bottom end of the rear frame, a protruding first snap-in block is fixedly arranged at a top end of the front frame, and a protruding second snap-in block is fixedly arranged at a top end of the rear frame.

3. The foldaway electric wagon capable of carrying people for outdoor usage according to claim 1, wherein the first foldaway frame comprises a first connecting rod and a second connecting rod; the first connecting rod intersects with the second connecting rod, the first connecting rod and the second connecting rod are rotationally connected at an intersection, one end of the first connecting rod is rotationally connected to the end of the first wagon frame away from the second wagon frame, the other end of the first connecting rod is rotationally connected to the second foldaway frame, one end of the second connecting rod is rotationally connected to the second foldaway frame, a first fixing member is connected to the end of the second connecting rod away from the connection to the first wagon frame, and a first snap-in hole is formed on the end of the first fixing member away from the connection to the second connecting rod.

4. The foldaway electric wagon capable of carrying people for outdoor usage according to claim 1, wherein the second foldaway frame comprises: a third connecting rod and a fourth connecting rod; the third connecting rod intersects with the fourth connecting rod, the third connecting rod and the fourth connecting rod are rotationally connected at an intersection, one end of the third connecting rod is rotationally connected to the end of the second wagon frame away from the first wagon frame, the other end of the third connecting rod is rotationally connected to the first foldaway frame, one end of the fourth connecting rod is rotationally connected to the first foldaway frame, a second fixing member is connected to the end of the fourth connecting rod away from the connection to the second wagon frame, and a second snap-in hole is formed on the end of the second fixing member away from the connection to the fourth connecting rod.

5. The foldaway electric wagon capable of carrying people for outdoor usage according to claim 1, wherein the pedal assembly comprises pedal brackets, the pedal brackets are arranged at the end of the first wagon frame away from the second wagon frame in a sliding manner, the pedal brackets can extend out from the first wagon frame, pedal brace rods are fixedly connected to both sides of the pedal brackets, telescopic grille pedals are arranged above the pedal brace rods, and the telescopic grille pedals can retract or expand with the sliding of the pedal brackets for supporting and carrying people.

6. The foldaway electric wagon capable of carrying people for outdoor usage according to claim 5, wherein side walls of the pedal brackets are each provided with unfolding limiting holes and folding limiting holes, limiting devices are arranged on two sides of one end of the first wagon frame provided with the pedal assembly, and the limiting devices have extending ends that are adapted to the unfolding limiting holes and the folding limiting holes.

7. The foldaway electric wagon capable of carrying people for outdoor usage according to claim 1, wherein the control assembly comprises a power source and a control panel; and the power source is electrically connected to the control panel, both the power source and the control panel are arranged on the end of the second wagon frame away from the first wagon frame, and the driving wheels are electrically connected to the control panel.

8. The foldaway electric wagon capable of carrying people for outdoor usage according to claim 1, wherein a mounting rod extending horizontally to both sides is arranged on a top of the direction rod, handles are respectively sleeved on both sides of the mounting rod in a sliding manner, the handles can slide in a direction close to the direction rod or in a direction away from the direction rod, the handle on one side can be rotated on the corresponding mounting rod for controlling the speed, a pedal expansion and retraction switch is arranged in the middle of the direction rod, the pedal expansion and retraction switch is electrically connected to the pedal assembly, and the pedal expansion and retraction switch is configured to control the expansion or retraction of the pedal assembly.

9. The foldaway electric wagon capable of carrying people for outdoor usage according to claim 8, wherein a pressing button is arranged in a middle of the mounting rod, the pressing button is vertically arranged at the top of the direction rod, a return spring is further arranged inside the direction rod, the return spring is connected to a bottom of the pressing button, the bottom of the pressing button is rotationally connected to two switch connecting rods, the switch connecting rods are movably arranged inside the two mounting rods, and a middle portion of the switch connecting rods are rotationally connected to the mounting rods; and a snap-in hook is formed at the end of the switch connecting rods away from the pressing button, the snap-in hook passes through the mounting rods, an unfolding snap-in slot is formed on the inner wall at the end of each of the handles adjacent to the direction rod, the unfolding snap-in slot is adapted to the snap-in hook, a folding snap-in slot is formed on the inner wall at the end of each of the handles away from the direction rod, and the folding snap-in slot is adapted to the snap-in hook.

10. The foldaway electric wagon capable of carrying people for outdoor usage according to claim 8, wherein a steering sensor is arranged at the bottom of the direction rod, and the steering sensor is electrically connected to the control assembly and is configured to identify a rotation direction of the direction rod.

* * * * *